Patented Feb. 3, 1942

2,272,011

UNITED STATES PATENT OFFICE 2,272,011

CHRYSENE DERIVATIVES AND PROCESS OF MAKING SAME

Walter Kern, Sissach, and Richard Tobler, Riehen, Switzerland, assignors to Society of Chemical Industry in Basle, Basel, Switzerland No Drawing. Application June 18, 1938, Serial No. 214,572. In Switzerland June 21, 1937

18 Claims. (Cl. 260—368)

This invention relates to the manufacture of derivatives of chrysene by causing a halogen substitution product of the chrysene to react with a compound which contains at least one hydrogen atom attached to nitrogen and a group capable of being vatted.

For the reaction with the halogen substitution product of chrysene, for instance 2-bromo-, 2:8-dibromo- or 2:8-dichlorochrysene which may contain other substituents besides halogen, there may be used various compounds containing at least one hydrogen atom attached to nitrogen and a group capable of being vatted, and, if desired, more than one mole of the same or different compounds of this kind may be caused to react simultaneously or successively on chrysene containing more than one halogen atom. Compounds which contain at least one hydrogen atom attached to nitrogen and a group capable of being vatted, for instance at least one cyclic bound carbonyl group, may be anthraquinone derivatives or they may belong to more highly condensed ring systems; such compounds are, for example, amino-anthraquinones, for instance 1-amino-anthraquinone and 1-aminoarylaminoanthraquinones, amino-acylamino-anthraquinones, wherein the acyl residues may be, for instance, the residue of an aliphatic, aromatic or heterocyclic acid, for instance carboxylic acids, for example 1-amino-4-benzoylaminoanthraquinone, 1-amino-5-benzoylamino-anthraquinone, 1-amino-5-benzoylamino-8-methoxyanthraquinone, 1-amino-5:8-dibenzoylaminoanthraquinone; 1-amino-anthraquinonoyl-amino-anthraquinone; amino-pyranthrones, aminoanthanthrones, aminoperylenequinones, aminodianthrones, amino-N-dihydro-anthraquinoneazines, amino-anthraquinone-azines, aminobenzpyrenequinones, aminoflavanthrenes, aminodibenzanthrones; amino-anthraquinone derivatives in which the 1- and 9-positions are members of a heterocyclic ring, for instance amino-1:9-anthrapyrimidines, amino-1:9-anthrapyridones, amino-1:9-isothiazole-anthrones and amino-1:9-pyrazole-anthrones; finally amino-anthraquinone derivatives in which two carbon atoms in ortho-position to each other are members of a heterocyclic ring system, for instance amino-1:2-anthraquinone-acridones. All these compounds may contain substituents.

In addition to the above mentioned amino-acylamino-anthraquinones there may also be used acylamino compounds in which the radical of the benzoic acid, or the radical of an anthraquinone carboxylic acid, is replaced by the radical of another acid, for example by the radical of acetic acid, propionic acid, butyric acid, stearic acid, phenylacetic acid, cinnamic acid, oxalic acid, succinic acid, halogen benzoic acids, alkoxy benzoic acids, alkyl benzoic acids, naphthalene carboxylic acids, phthalic acids, pyridine and quinoline carboxylic acids.

The reaction between the halogen substitution product of chrysene and the compounds containing at least one hydrogen atom bound to nitrogen as well as at least one cyclic-bound carbonyl group may advantageously be brought about by heating the components together in a solvent or diluent, for instance nitrobenzene, chloronaphthalene or amyl alcohol, preferably in the presence of a catalyst, for instance copper or copper compound, as well as of an acid binding agent, for instance an alkali carbonate, and/or dehydrated sodium acetate.

The products of the invention are especially valuable intermediate products for the manufacture of dyestuffs.

The following examples illustrate the invention, the parts being by weight unless otherwise stated, and the relationship of the parts by volume to parts by weight is that which exists between the litre and the kilo.

Example 1

46.8 parts of 2:8-dibromochrysene, obtainable by dibrominating chrysene in glacial acetic acid, as prescribed in Ber. 60, page 145 or in J. pr. Ch. (2), 9, 275, 56 parts of 1-amino-anthraquinone, 9.6 parts of cuprous chloride and 54 parts of anhydrous sodium acetate are together stirred with 720 parts of nitrobenzene for 16 hours at a temperature of 190–200° C. The product of reaction separates and is filtered. To remove the copper compounds it is extracted with boiling dilute hydrochloric acid, whereupon brown-violet needles are obtained. These may be recrystallized from α-chloronaphthalene. They dissolve in concentrated sulfuric acid to a brown solution and melt at above 400° C. Determination of nitrogen shows that this product is a di-(1'-anthraquinonyl)-2:8-diaminochrysene of the formula

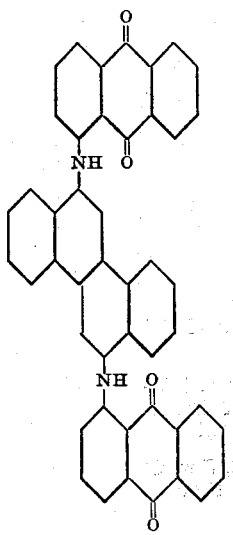

*Example 2*

10.3 parts of 2-bromochrysene made by monobrominating chrysene in nitrobenzene, 6 parts of anhydrous sodium acetate, 7.5 parts of 1-amino-anthraquinone and 1.6 parts of cuprous chloride are suspended in 145 parts of nitrobenzene and the whole is heated for 20 hours at 190–200° C. After cooling, the mixture is filtered and the solid matter washed with nitrobenzene and benzene and then extracted with boiling hydrochloric acid of 1 per cent strength for purification. Red needles are obtained in good yield; they may be recrystallized from nitrobenzene and then melt at 280–285° C. They color concentrated sulfuric acid brown. Analysis shows them to be a 1'-(anthraquinonyl)-2-amino-chrysene of the formula

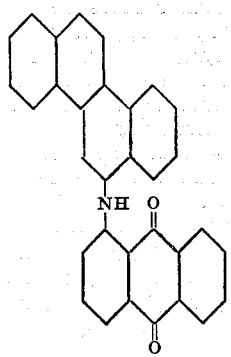

*Example 3*

10.3 parts of 2-bromochrysene, made by monobrominating chrysene in nitrobenzene, 12 parts of 1-amino-4-benzoylamino-anthraquinone, 1,6-parts of cuprous chloride and 6 parts of anhydrous sodium acetate are suspended in 145 parts of nitrobenzene and the whole is stirred for 20 hours at a temperature of 190–200° C. After cooling and filtering, the solid matter is washed and extracted with boiling dilute hydrochloric acid for removing copper compounds. This condensation product obtained in very good yield can be recrystallized from nitrobenzene to form blue needles which dissolve in concentrated sulfuric acid to a brown-yellow solution, decompose at 340–350° C. and can be vatted with difficulty.

The product is (4'-benzoylamino-anthraquinonyl-1'-)-2-aminochrysene of the formula

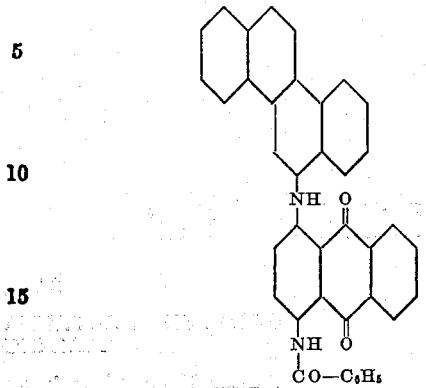

When 2-bromochrysene is condensed with 1-amino-5-benzoylamino-anthraquinone there is obtained (5'-benzoylamino-anthraquinonyl-1'-)-2-aminochrysene, a brown crystalline powder which dissolves in concentrated sulfuric acid to a brown solution.

A similar product is obtained by using 2-bromo-8-nitrochrysene instead of 2-bromochrysene.

*Example 4*

18 parts of anhydrous sodium acetate and 18 parts of calcined sodium carbonate are together heated to boiling with 480 parts of nitrobenzene until 30 parts of nitrobenzene have distilled. After cooling to 190–200° C. (oil bath temperature) 23.2 parts of 2:8-dibromochrysene, 42 parts of 1-amino-4-benzoylamino-anthraquinone and 1.5 parts of cuprous chloride are added and the whole is stirred at the said temperature for 16 hours. It is then filtered hot and the solid matter is washed with nitrobenzene, benzene and alcohol and extracted with boiling dilute hydrochloric acid for purification; it is filtered, washed and dried. There is obtained in very good yield (above 90 per cent) a blue powder which colors concentrated sulfuric acid brown-yellow, melts at above 460° C. and is vatted with great difficulty. Analysis shows it to be di-(4'-benzoyl-amino-1'-anthraquinonyl)-2:8-diaminochrysene of the formula

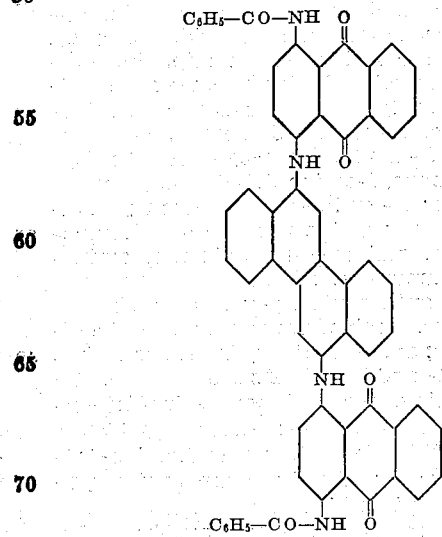

The same product is obtained by substituting for the 2:8-dibromochrysene an equivalent quantity of 2:8-dichlorochrysene.

The 2:8-dibromochrysene used in this example is made as follows:

22.8 parts of chrysene of melting point 251° C. are suspended in 200 parts of nitrobenzene and into the suspension there are dropped at a temperature of 15–25° C. and in the course of 3 hours 35 parts of bromine. This mixture is stirred first for 16 hours at 25–30° C. and then for 22 hours at 35–40° C. The 2:8-dibromochrysene is by this time separated and may be filtered after passage of air through the mixture to remove hydrogen bromide. It is a crystalline powder which melts at 273–275° C.

The distillation of the nitrobenzene prescribed in the first paragraph of this example is not necessary when dry nitrobenzene is used.

Example 5

4.5 parts of anhydrous sodium acetate and 4.5 parts of calcined sodium carbonate are heated to boiling with 138 parts of nitrobenzene until 18 parts of nitrobenzene have distilled. After cooling to 190–200° C. (temperature of the oil bath) there are added 5.8 parts of 2:8-dibromochrysene obtained by dibrominating chrysene in nitrobenzene, 10.5 parts of 1-amino-5-benzoylamino-anthraquinone and 0.4 part of cuprous chloride and the whole is stirred for 16 hours at the said temperature. The mass is now filtered hot and the solid matter is washed with nitrobenzene, nitrobenzene is distilled from it by steam and the remaining dyestuff is extracted with boiling dilute hydrochloric acid for further purification, filtered, washed and dried. There are obtained in very good yield brown-olive needles which color concentrated sulfuric acid red-brown and melt at above 460° C. Analysis shows this compound to be di-(5'-benzoylamino-1'-anthraquinonyl)-2:8-diaminochrysene of the formula

Example 6

3.8 parts of 2:8-dibromochrysene made by dibrominating chrysene in nitrobenzene, 7.5 parts of 1-amino-5-benzoylamino-8-methoxy-anthraquinone, 3 parts of calcined sodium carbonate, 3 parts of anhydrous sodium acetate and 0.3 part of cuprous chloride are together suspended in 72 parts of nitrobenzene and the whole is kept at a temperature of 190–200° C. for 16 hours. The mixture is then filtered hot, the solid matter is washed with nitrobenzene, benzene and alcohol and is purified by extraction with boiling dilute hydrochloric acid. Small brown-violet prisms are thus obtained in good yield; they dissolve in concentrated sulfuric acid to a brown solution and melt at above 460° C. Analysis shows them to be a di-(5'-benzoylamino-8'-methoxy-1'-anthraquinonyl)-2:8-diaminochrysene of the formula

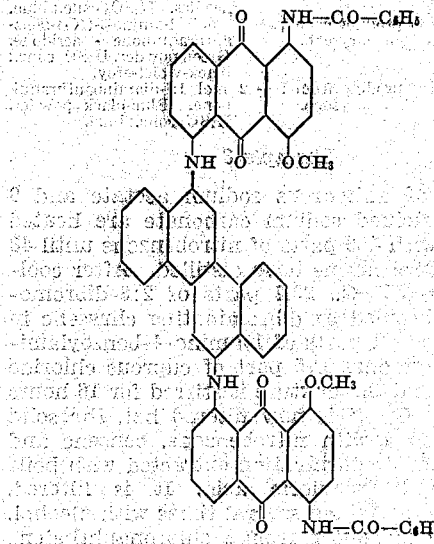

Example 7

11.6 parts of 2:8-dibromochrysene, 15.3 parts of 1-amino-4-methoxyanthraquinone, 9 parts of anhydrous sodium acetate, 9 parts of calcined sodium carbonate and 0.9 part of cuprous chloride are together suspended in 200 parts of nitrobenzene and the whole is kept at a temperature of 193–203° C. for 16 hours. The mixture is then filtered hot, the solid matter is washed with nitrobenzene and with benzene and is then purified by extraction first with boiling dilute hydrochloric acid and then with boiling alcohol. There is obtained in very good yield a green crystalline powder soluble in concentrated sulfuric acid to a blue-violet solution and having a melting point above 460° C. Analysis shows the compound to be di-4'-methoxy-1'-anthraquinonyl-2:8-diaminochrysene of the formula

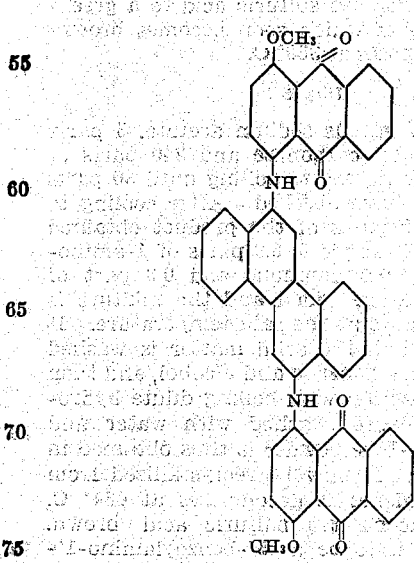

In like manner the following bodies may be made:

(1) Condensation product from 1 + 2 mol 2:8-dibromochrysene — mol 1-amino-8-benzoylamino-anthraquinone. Brown to olive needles. H₂SO₄ conc.; orange.
(2) Condensation product from 1 + 2 mol 2:8-dibromochrysene — mol 4:4'-diamino-1:1'-dianthrimide. Black-blue powder. H₂SO₄ conc.: green-blue.
(3) Condensation product from 1 + 2 mol 2:8-dibromochrysene — mol 1-amino-4-anilinoanthraquinone. Blue-violet needles. H₂SO₄ conc.: blue.
(4) Condensation product from 1 + 2 mol 2:8-dibromochrysene — mol 1-amino-3-(N)4-benzanthraquinone - acridone. Green powder. H₂SO₄ conc.: black-violet-grey.
(5) Condensation product from 1 + 2 mol 2:8-dibromochrysene — mol 1:4-diaminoanthraquinone. Blue-black powder. H₂SO₄ conc.: blue.

Example 8

9 parts of anhydrous sodium acetate and 9 parts of calcined sodium carbonate are heated to boiling with 480 parts of nitrobenzene until 48 parts of nitrobenzene have distilled. After cooling to 160–165° C., 23.2 parts of 2:8-dibromochrysene obtained by dibrominating chrysene in nitrobenzene, 21 parts of 1-amino-4-benzoylamino-anthraquinone, 0.75 part of cuprous chloride are added and the mixture is stirred for 16 hours at 160–165° C. It is now filtered hot, the solid matter washed with nitrobenzene, benzene and alcohol, and for purification extracted with boiling dilute hydrochloric acid. It is filtered, washed and extracted several times with alcohol. After recrystallization from α-chloronaphthalene there is obtained a good yield of small blue needles of the formula

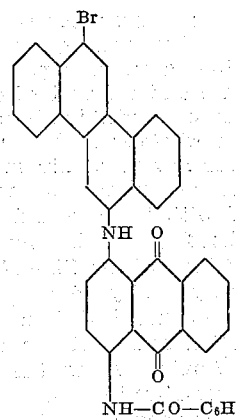

soluble in concentrated sulfuric acid to a greenish yellow solution which soon becomes brown-olive and decomposes at 380° C.

Example 9

3 parts of anhydrous sodium acetate, 3 parts of calcined sodium carbonate and 240 parts of nitrobenzene are heated to boiling until 30 parts of nitrobenzene have distilled. After cooling to 190–200° C., 12.9 parts of the product obtained as described in Example 8, 6.9 parts of 1-amino-5-benzoylamino-anthraquinone and 0.3 part of cuprous chloride are added and the mixture is stirred for 16 hours at the said temperature. It is now filtered hot, the solid matter is washed with nitrobenzene, benzene and alcohol, and then purified by extraction with boiling dilute hydrochloric acid, filtered, washed with water and dried. A brown-blue powder is thus obtained in very good yield. It may be recrystallized from α-chloronaphthalene; it decomposes at 434° C. and colors concentrated sulfuric acid brown. Analysis shows it to be a (5'-benzoylamino-1'-anthraquinonyl)-(4'-benzoylamino-1'-anthraquinonyl)-2:8-diaminochrysene of the formula

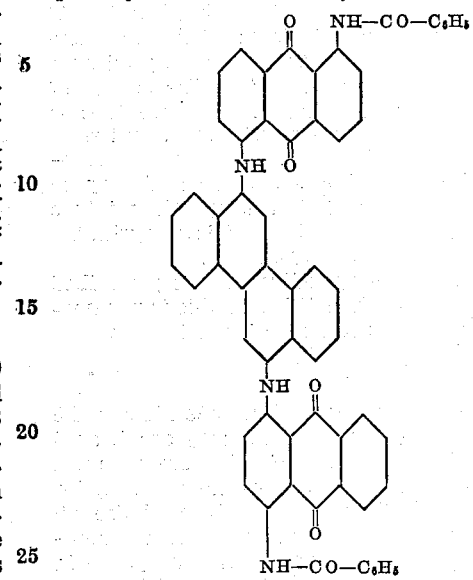

Example 10

11 parts of a tetrabromochrysene, 28 parts of 1-amino-4-benzoylamino-anthraquinone, 12 parts of calcined sodium carbonate, 12 parts of anhydrous sodium acetate and 1 part of cuprous chloride are suspended in 480 parts of nitrobenzene and the mixture is kept at 190–200° C. for 16 hours. It is then filtered hot and the solid matter extracted with boiling nitrobenzene, then again filtered, washed and extracted with boiling dilute hydrochloric acid to purify it. There is thus obtained in good yield a black-green powder which dissolves in concentrated sulfuric acid to an olive-green solution; it melts at above 460° C. and dyes cotton in a red-brown vat grey-green tints.

If instead of 1-amino-4-benzoylamino-anthraquinone there is used 1-amino-5-benzoylamino-anthraquinone one obtains a brownish black product which dissolves in concentrated sulfuric acid to an olive brown solution and decomposes at above 460° C.

The tetrabromochrysene used in this example may be made as follows:

45.6 parts of chrysene are suspended in 400 parts of nitrobenzene, some iodine is added and in the course of 8 hours 280 parts of bromine are added by drops at 15–25° C. The whole is then stirred for 16 hours at 25–30° C. and then for 24 hours at 35–40° C., followed by one hour at 50–60° C. and finally one hour at 115–120° C. By this time the product has separated and filtered at 100° C., washed and dried. After two recrystallisations from nitrobenzene colorless needles are obtained which melt at above 300° C. and contain 59 per cent of bromine corresponding with a tetrabromochrysene.

A similar brominated chrysene is obtained by brominating dibromochrysene in a concentrated sulfuric acid solution in the presence of iodine.

A product similar to that described in paragraph 1 of this example is obtained when a more highly brominated chrysene is used which has been made in the following manner:

36.8 parts of 2.8-dibromochrysene obtainable by dibrominating chrysene in nitrobenzene are suspended in 400 parts of nitrobenzene, some iodine is added and there are added to the mixture by drops 108 parts of bromine in the course of 8 hours at 20° C. Stirring is first conducted for 16 hours at 25–30° C., whereupon the temperature is raised by stages, namely 24 hours at 35–40° C. and one hour each at 50–60° C., 115–120° C. and 190° C. After cooling to 110° C., the whole is filtered by suction and the solid matter is washed, whereby white needles are obtained which after recrystallisation from nitrobenzene melt at 345° C.

*Example 11*

9 parts of anhydrous sodium acetate, 9 parts of calcined sodium carbonate and 480 parts of nitrobenzene are heated together to boiling until 48 parts of nitrobenzene have distilled. After cooling to 160–165° C. there are added 23.2 parts of 2:8-dibromochrysene obtained by dibrominating chrysene in nitrobenzene, 20.6 parts of 1-amino-5-benzoylamino-anthraquinone and 0.75 part of cuprous chloride, and the mixture is stirred for 16 hours at 160–165° C. After filtering hot the solid matter is washed with nitrobenzene, benzene and alcohol and is extracted with boiling dilute hydrochloric acid to purify it, finally filtered, washed and again extracted with alcohol. Brown olive needles of the formula

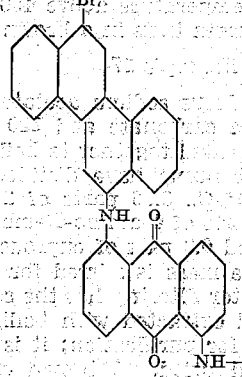

are obtained in good yield; they dissolve in concentrated sulfuric acid to a brown solution and melt at above 300° C.

*Example 12*

1.5 parts of anhydrous sodium acetate, 1.5 parts of calcined sodium carbonate and 120 parts of nitrobenzene are heated together to boiling until 12 parts of nitrobenzene have distilled. After cooling to 193–200° C., 6.5 parts of the product obtained as described in Example 11, 3.5 parts of amino-5-benzoylamino-anthraquinone and 0.15 part of cuprous chloride are added and the mixture is stirred for 16 hours at an external temperature of 194–204° C. After filtering hot, the solid matter is washed with nitrobenzene, benzene and alcohol and for purification extracted with boiling dilute hydrochloric acid, filtered, washed and again extracted with boiling alcohol. There is obtained in very good yield the di-(5'-benzoylamino-1'-anthraquinonyl)-2:8-diaminochrysene described in Example 5.

*Example 13*

1.95 parts of 2:8-dibromochrysene, 3.85 parts of 1-amino-5-(para-methoxy-benzoylamino-anthraquinone, 1.5 parts of anhydrous sodium acetate, 1.5 parts of calcined sodium carbonate and 0.15 part of cuprous chloride are suspended in 60 parts of dry nitrobenzene and the mixture is stirred for 18 hours at a temperature of 193–203° C. The mass is filtered hot and the solid matter washed with nitrobenzene, benzene and alcohol and extracted with boiling dilute hydrochloric acid for purification, then filtered, washed and dried. There is obtained in good yield a red-brown powder of the formula

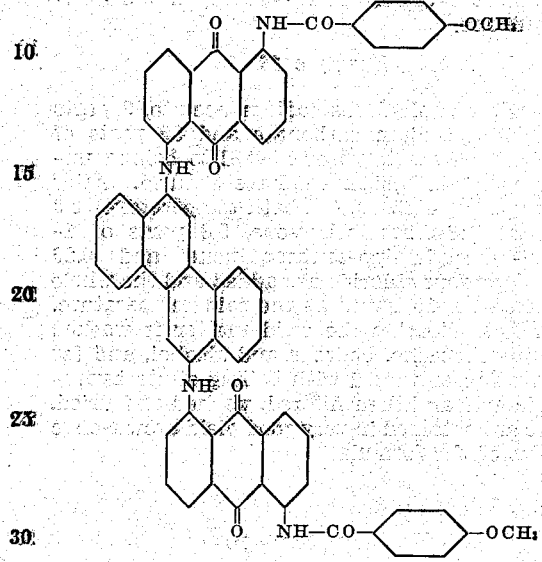

soluble in concentrated sulfuric acid to a brown solution and melting at a temperature above 460° C.

*Example 14*

1.95 parts of 2:8-dibromochrysene, 3.9 parts of 1-amino-5-(para-chloro)-benzoylamino-anthraquinone, 1.5 parts of anhydrous sodium acetate, 1.5 parts of calcined sodium carbonate and 0.15 part of cuprous chloride are suspended in 60 parts of dry nitrobenzene and the mixture is stirred for 18 hours at a temperature of 193–203° C. The mass is then filtered hot and the solid matter washed with nitrobenzene, benzene and alcohol, and extracted with boiling dilute hydrochloric acid for purification; it is then filtered, washed and dried. There is obtained in good yield a dark brown powder of the formula

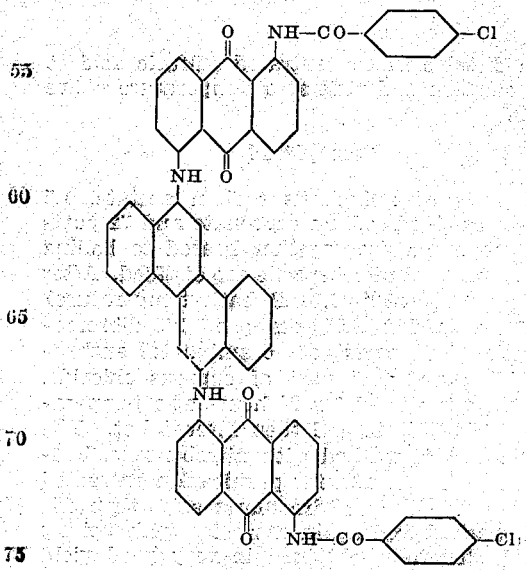

soluble in concentrated sulfuric acid to a brown solution and melting at a temperature above 460° C.

A similar condensation product is obtained if in place of the 1-amino-5-(para-chloro)-benzoylamino-anthraquinone there is used 1-amino-5-(ortho-chloro)-benzoylamino-anthraquinone or 1-amino-5-(meta-chloro)-benzoylamino-anthraquinone.

*Example 15*

3 parts of anhydrous sodium acetate, 3 parts of calcined sodium carbonate and 96 parts of nitrobenzene are together heated to boiling until 12 parts of nitrobenzene have distilled. After cooling to 193-203° C. (oil bath temperature) 3.9 parts of 2:8-dibromochrysene, 5.8 parts of 1-amino-5-acetylamino-anthraquinone and 0.26 part of cuprous chloride are added and the whole is stirred for 18 hours at the said temperature. After hot filtration the solid matter is washed with nitrobenzene, benzene and alcohol, and for purification extracted with boiling dilute hydrochloric acid and then filtered, washed and dried. There are obtained in very good yield brown-olive needles of the formula

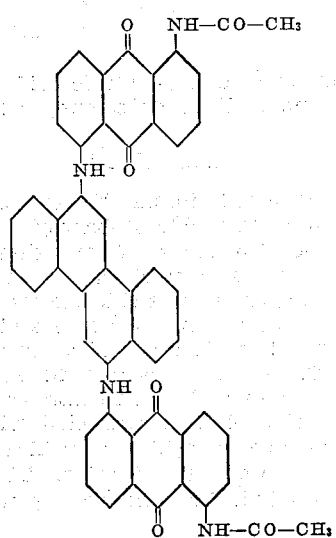

which dissolve in concentrated sulfuric acid to a red solution and melt at a temperature above 460° C.

*Example 16*

1.5 parts of anhydrous sodium acetate, 1.5 parts of calcined sodium carbonate and 72 parts of nitrobenzene are together heated to boiling until 12 parts of nitrobenzene are distilled. After cooling to 190-200° C. (oil bath temperature) there are added 1.95 parts of 2'8-dibromochrysene, 2.6 parts of 5-amino-1:9-anthrapyrimidine and 0.15 part of cuprous chloride. The whole is stirred for 24 hours at a temperature of 196-206° C. and then filtered hot. The solid matter is washed with nitrobenzene, benzene and alcohol, and for purification extracted with boiling dilute hydrochloric acid, then filtered, washed and again extracted with boiling alcohol. There is obtained in very good yield an olive-brown crystalline powder of the formula

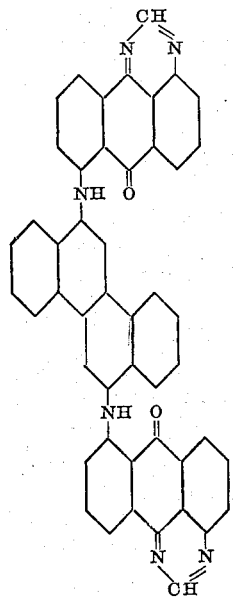

which colors concentrated sulfuric acid brown-olive, melts at a temperature above 460° C. and dyes cotton grey-green tints in a brown vat.

*Example 17*

3 parts of anhydrous sodium acetate, 3 parts of calcined sodium carbonate and 120 parts of nitrobenzene are heated together to boiling until 12 parts of nitrobenzene have distilled. After cooling to 190-200° C., 3.86 parts of 2:8-dibromochrysene, 5.7 parts of 4-amino-N-methyl-1:9-anthrapyridone and 0.3 part of cuprous chloride are added and the mass is stirred for 24 hours at 196-206° C. After filtering hot the solid matter is washed and extracted with boiling dilute hydrochloric acid for purification; it is then filtered, washed and dried. A brown crystalline powder of the formula

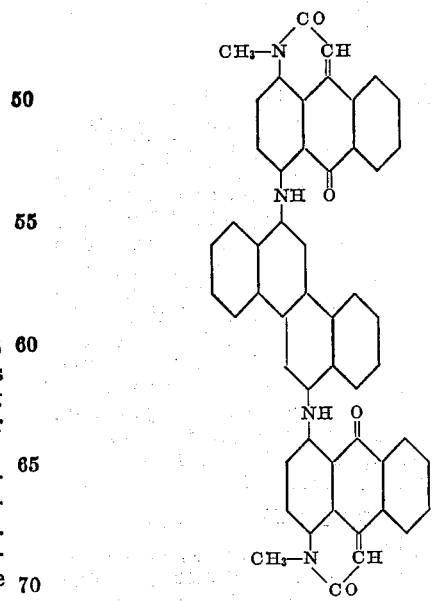

is thus obtained in good yield; it colors concentrated sulfuric acid violet and melts at a temperature above 460° C. Analysis shows it to be a condensation product from 1 mol 2:8-dibromochrysene and 2 mols 4-amino-N-methyl-1:9-anthrapyridone.

Example 18

3 parts of calcined sodium carbonate, 3 parts of anhydrous sodium acetate and 108 parts of nitrobenzene are together boiled until 12 parts of nitrobenzene have distilled. After cooling to 193–203° C., 3.86 parts of 2:8-dibromochrysene, 7.6 parts of 1-amino-5-cinnamoylamino-anthraquinone and 0.3 part of cuprous chloride are added and the mixture is stirred at the said temperature for 24 hours. The solid matter is filtered hot, washed and extracted with boiling dilute hydrochloric acid for purification, then filtered, washed and extracted with boiling alcohol. A brown powder of the formula

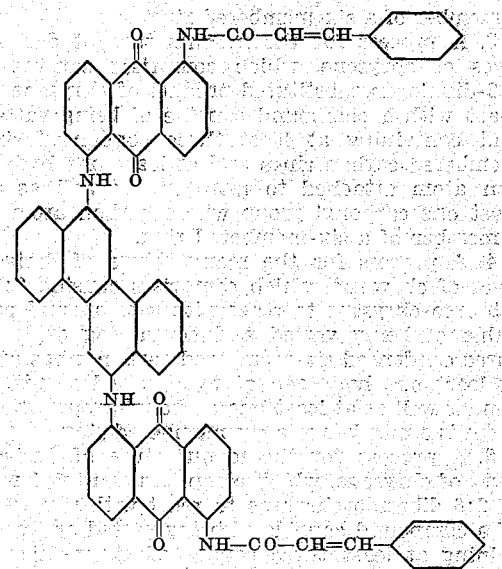

is thus obtained in good yield which dissolves in concentrated sulfuric acid to a brown solution.

When 1 mol 2:8-dibromochrysene is condensed with 2 mols 1-amino-5:8-pyridoylamino-anthraquinone there is obtained an olive-brown powder of the formula

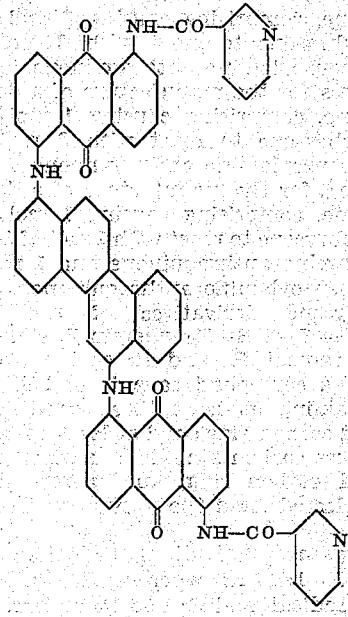

soluble in concentrated sulfuric acid to a red solution.

The condensation of 1 mol 2:8-dibromochrysene with 2 mols of 1-amino-5-(2'-anthraquinonoyl)-amino-anthraquinone yields a brown powder of the formula

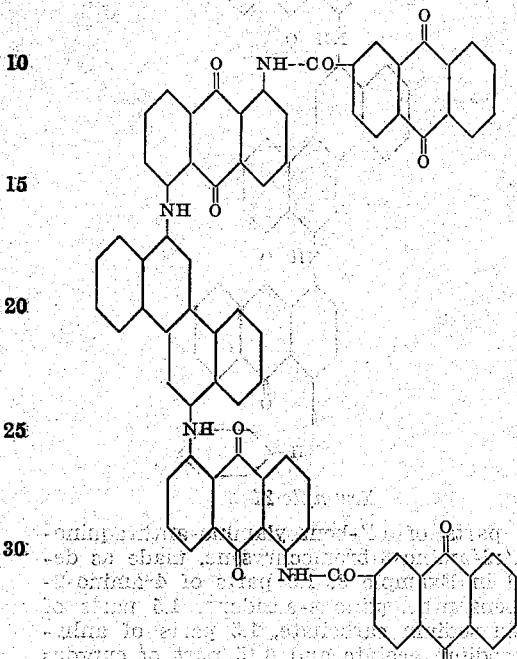

which colors concentrated sulfuric acid brown-red and dyes cotton olive-brown tints in a brown vat.

Example 19

4.7 parts of finely powdered amino-dibenzanthrone, 1.95 parts of 2:8-dibromochrysene, 1.5 parts each of anhydrous sodium acetate and calcined sodium carbonate and 0.2 part of cuprous chloride are suspended in 120 parts of nitrobenzene and the mixture is kept at a temperature of 208–212° C. for 22 hours. It is then filtered hot and the solid matter is washed with nitrobenzene, benzene and alcohol and extracted with dilute hydrochloric acid for purification. A black powder is thus obtained in good yield. It dissolves in concentrated sulfuric acid to a red-violet solution. It melts at above 460° C. and dyes cotton fast greenish grey tints in a blue vat.

Example 20

9.7 parts of (4'-benzoylamino-anthraquinonyl)-1':2-amino-8-bromchrysene obtained as described in Example 8, 6.9 parts of 1-amino-4-anilino-anthraquinone, 2.5 parts of anhydrous sodium acetate, 2.5 parts of calcined sodium carbonate and 0.3 part of cuprous chloride are suspended in 120 parts of dry nitrobenzene and the mixture is stirred for 16 hours at a temperature of 193–203° C. It is then filtered hot and the solid matter washed and extracted with boiling dilute hydrochloric acid for purification. A dark blue powder is obtained in very good yield which dissolves in concentrated sulfuric acid to a dull green solution. Analysis shows this product to be a (4'-benzoylamino-1'-anthraquinonyl)-(4'- anilino-1'-anthraquinonyl)-2:8-diaminochrysene of the formula

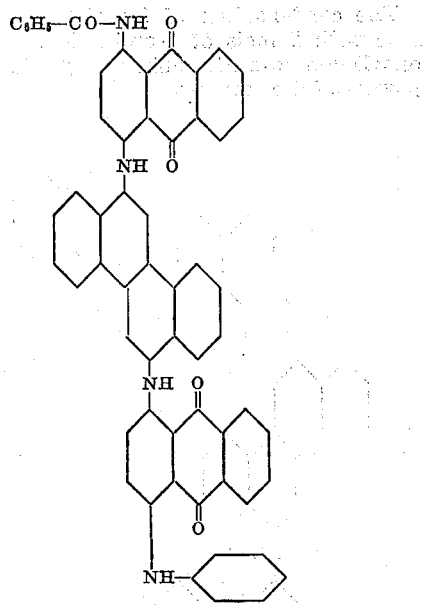

*Example 21*

3.25 parts of (4'-benzoylamino-anthraquinonyl)-1':2-amino-8-bromochrysene, made as described in Example 8, 1.8 parts of 4-amino-2-(N)1-benzanthraquinone-acridone, 1.5 parts of calcined sodium carbonate, 1.5 parts of anhydrous sodium acetate and 0.15 part of cuprous chloride are suspended in 70 parts of dry nitrobenzene and the mixture is kept at a temperature of 196–206° C. for 24 hours. It is then filtered hot and the solid matter is washed with nitrobenzene, benzene and alcohol, and purified by extraction with boiling dilute hydrochloric acid. A blue powder of the formula

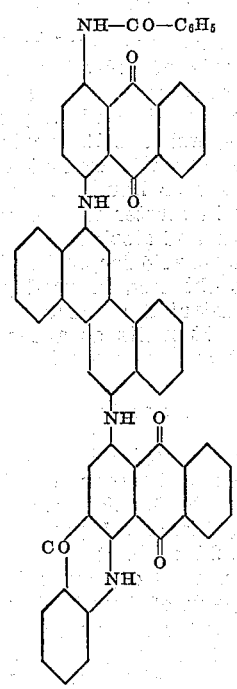

is thus obtained in good yield which dissolves in concentrated sulfuric acid solution which is at first red-brown and then olive-brown; it melts at above 460° C. and dyes cotton green in an olive vat.

What we claim is:

1. A process for the manufacture of derivatives of chrysene, which comprises causing a halogen substituted product of chrysene to react with a compound capable of being vatted and containing at least three condensed six-membered carbon rings and at least one hydrogen atom attached to nitrogen, as well as at least one carbonyl group whose carbon atom is a member of a six-member ring.

2. A process for the manufacture of derivatives of chrysene, which comprises causing a dihalogen substituted product of chrysene to react with a compound capable of being vatted and containing at least three condensed six-membered carbon rings and at least one hydrogen atom attached to nitrogen, as well as at least one carbonyl group whose carbon atom is a member of a six-membered ring.

3. A process for the manufacture of derivatives of chrysene, which comprises causing a 2:8-dihalogen substituted product of chrysene to react with a compound capable of being vatted and containing at least three condensed six-membered carbon rings and at least one hydrogen atom attached to nitrogen, as well as at least one carbonyl group whose carbon atom is a member of a six-membered ring.

4. A process for the manufacture of derivatives of chrysene, which comprises causing 2:8-dibromo-chrysene to react with a compound capable of being vatted and containing at least three condensed six-membered carbon rings and at least one hydrogen atom attached to nitrogen, as well as at least one carbonyl group whose atom is a member of a six-membered ring.

5. A process for the manufacture of derivatives of chrysene, which comprises causing 1 mol of 2:8-dibromo-chrysene to react with two mols of a compound capable of being vatted and containing at least three condensed six-membered carbon rings and at least one hydrogen atom attached to nitrogen, as well as at least one carbonyl group whose carbon atom is a member of a six-membered ring.

6. Process for the manufacture of derivatives of chrysene, comprising causing 1 mol of 2:8-dibromo-chrysene to react with 2 mols of an amino-acylamino-anthraquinone.

7. Process for the manufacture of a derivative of chrysene, comprising causing 1 mol of 2:8-dibromo-chrysene to react with 2 mols of 1-amino-5-benzoylamino-anthraquinone.

8. Process for the manufacture of a derivative of chrysene, comprising causing 1 mol of 2:8-dibromo-chrysene to react with 2 mols of 1-amino-4-benzoylamino-anthraquinone.

9. Process for the manufacture of a derivative of chrysene, comprising causing 1 mol of 2:8-dibromo-chrysene to react with 1 mol of 1-amino-5-benzoylamino-anthraquinone and 1 mol of 1-amino-4-benzoylamino-anthraquinone.

10. Chrysene derivatives of the formula $(R_1-NH)_n-R-NH-R_2$ wherein R stands for a chrysene radical, $R_1$ and $R_2$ each represents a radical of a compound capable of being vatted and containing at least three condensed six-membered carbon rings and at least one carbonyl group whose carbon atom is a member of a six-membered carbon ring, and $n$ represents an integer selected from the group consisting of 1, 2 and 3.

11. Chrysene derivatives of the formula $R_1-NH-R-NH-R_2$ wherein R stands for a chrysene radical, and $R_1$ and $R_2$ each represents a radical of a compound capable of being vatted and containing at least three condensed six-membered carbon rings and at least one carbonyl group whose carbon atom is a member of a six-membered carbon ring.

12. Chrysene derivatives of the formula $R_1$—NH—R—NH—$R_2$ wherein R stands for a chrysene radical, and $R_1$ and $R_2$ each represents a radical of an acylaminoanthraquinone.

13. Chrysene derivatives of the general formula

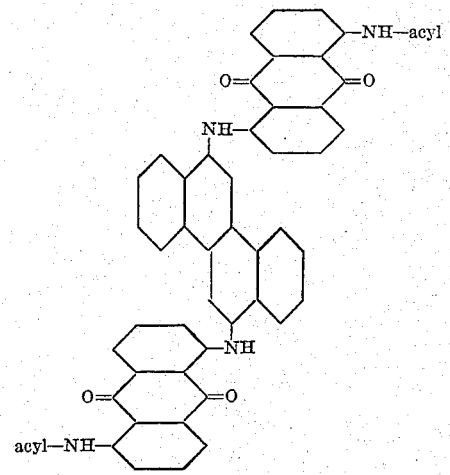

14. Chrysene derivatives of the general formula

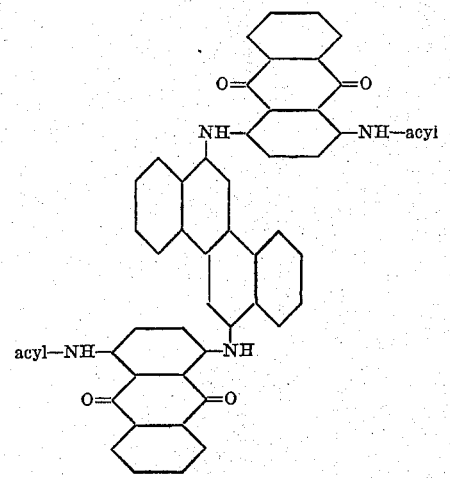

15. Chrysene derivatives of the general formula

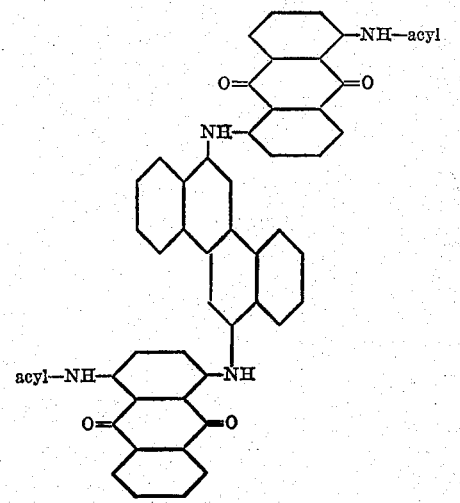

16. The chrysene derivative of the formula

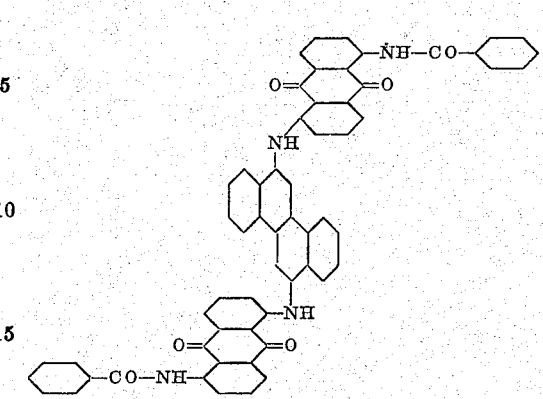

17. The chrysene derivative of the formula

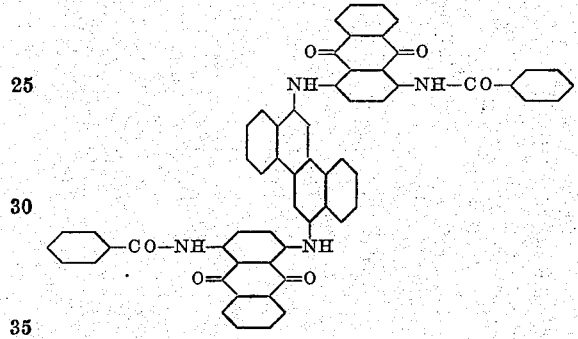

18. The chrysene derivative of the formula

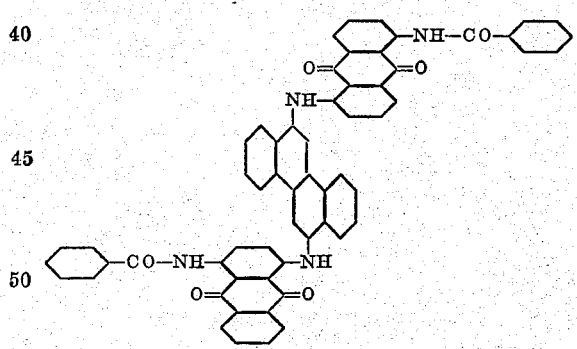

WALTER KERN.
RICHARD TOBLER.